United States Patent [19]
Kemmler et al.

[11] Patent Number: 5,088,345
[45] Date of Patent: Feb. 18, 1992

[54] COMPOSITE CRANKSHAFT FOR A TWO-STROKE ENGINE

[75] Inventors: Ralf-Rainer Kemmler, Althütte; Hans P. Stehle, Waiblingen; Andreas Decool, Fellbach, all of Fed. Rep. of Germany

[73] Assignee: Stihl Andreas, Waiblingen

[21] Appl. No.: 711,801

[22] Filed: Jun. 7, 1991

[30] Foreign Application Priority Data

Jun. 9, 1990 [DE] Fed. Rep. of Germany ....... 4018542

[51] Int. Cl.$^5$ .............................................. F16C 3/04
[52] U.S. Cl. ................................... 74/598; 29/888.08; 403/242
[58] Field of Search ................. 74/595, 598; 403/242, 403/335; 29/888.08

[56] References Cited

U.S. PATENT DOCUMENTS

| | | | |
|---|---|---|---|
| 1,136,524 | 4/1915 | Hartwig | 74/598 |
| 2,009,971 | 7/1935 | Kylen | 74/598 |
| 2,747,428 | 5/1956 | Peter et al. | 74/598 |
| 4,624,156 | 11/1986 | Kamata | 74/595 |
| 4,641,546 | 2/1987 | Mettler | 74/598 |

FOREIGN PATENT DOCUMENTS

| | | | |
|---|---|---|---|
| 3123114 | 12/1982 | Fed. Rep. of Germany | 29/888.08 |
| 58-215237 | 12/1983 | Japan | 29/888.08 |
| 59-13539 | 1/1984 | Japan | 29/888.08 |
| 60-102245 | 6/1985 | Japan | 29/888.08 |

Primary Examiner—Leslie A. Braun
Assistant Examiner—Ryan W. Massey
Attorney, Agent, or Firm—Walter Ottesen

[57] ABSTRACT

The invention is directed to a composite crankshaft for a two-stroke engine for portable handheld work tools including chain saws, cutoff machines and the like. In composite crankshafts, a crank pin is connected to a crank web by a press fit wherein the inner diameter of the press-fit bore is expanded toward its axial end in order to reduce stress peaks. In this way, the press-fit surface has a radial spacing with respect to the center longitudinal axis of the press fit which changes. The press fit of the crankshaft of the invention is so configured that the radial distance of the press-fit surface changes in dependence upon the axial spacing to the axial center of the press fit according to an exponential function having the equation $f(x)=a \cdot e^{b \cdot x}$ wherein (a) and (b) are pregiven constants, (x) is the axial spacing and f(x) is the radial spacing. In the composite crankshaft of the invention, stress fields produced by the press fit are substantially uniform and the load on the crankshaft is reduced.

9 Claims, 4 Drawing Sheets

COMPOSITE CRANKSHAFT FOR A TWO-STROKE ENGINE

FIELD OF THE INVENTION

The invention relates to a composite crankshaft for a two-stroke engine such as for a two-stroke engine mounted in portable handheld work apparatus including chain saws, cutoff machines and the like.

BACKGROUND OF THE INVENTION

In composite crankshafts, the press fit defines the connection between the crank web and the crank pin and is especially heavily stressed which has often led to the condition wherein the cylindrically-configured press fits fracture already after only short operational use. Press-fit connections have also been configured so that the stress fields emanating from the connecting locations lie in different planes in order to prevent stress peaks. For this purpose, the crank pin was configured so as to have a taper whereby the diameter overlap over the axial length of the press-fit connection becomes continuously reduced. Press fits of this kind are, however, unsatisfactory in practice and for this reason, the press-fit parts are oversized to prevent stress fractures.

SUMMARY OF THE INVENTION

It is an object of the invention to provide a composite crankshaft wherein the stress fields produced by the press fit are substantially uniform and the load on the crankshaft is reduced.

The composite crankshaft of the invention is for a two-stroke engine such as for a two-stroke engine in portable handheld work apparatus including chain saws, cutoff machines and the like. The composite crankshaft includes: a crank web; a crank pin; a press-fit for connecting the crank web and the crank pin to each other; the crank web having a first surface formed therein and the crank pin having a second surface formed thereon for engaging the first surface to define the press fit; the press fit defining a center longitudinal axis and having respective axial ends; the press fit further defining an axial center disposed between the axial ends; at least one of the surfaces being configured to have a radial spacing (R) from the axis which changes as a function of the axial distance (x) to the axial center of the press fit pursuant to an exponential function defined by the equation $$f(x) = a \cdot e^{b \cdot x}$$

wherein (a) and (b) are pregiven constants and f(x) is the radial distance (R).

It has been shown that by reducing the diameter overlap in accordance with the above exponential function, a service life is obtained which is up to four times longer than with known press-fit connections. This effect has been deemed by persons working in this area as surprising and can be attributed entirely to the configuration of the press-fit connection corresponding to the exponential function shown above. The overdimensioning of the press-fit parts required in known crankshafts because of reliability reasons therefore becomes unnecessary.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
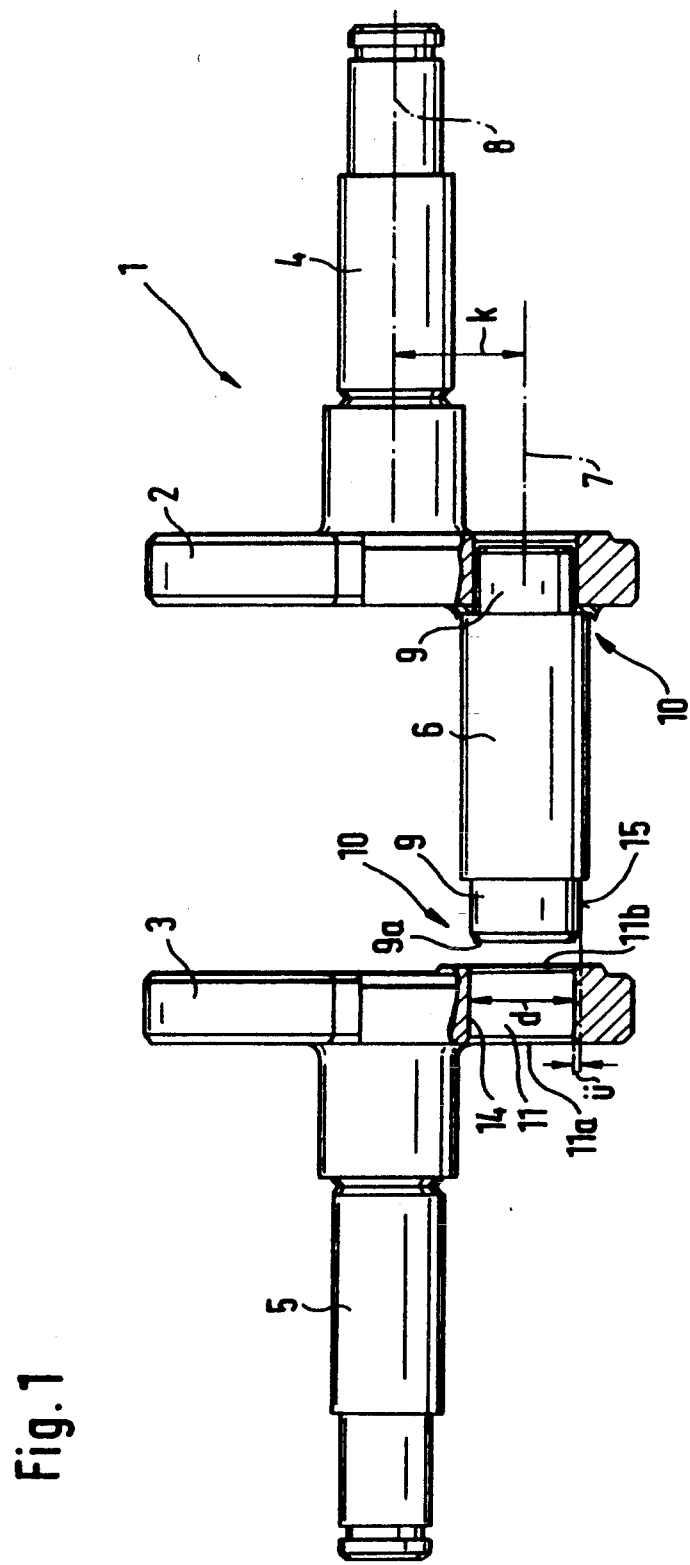
FIG. 1 is a side elevation view of a composite crankshaft for a single-cylinder two-stroke engine with a portion of the composite crankshaft broken out to show the press-fit bore.

In FIG. 1, a composite crankshaft 1 is shown which can, for example, be manufactured from a light metal such as a magnesium alloy. The composite crankshaft comprises crank webs (2 and 3) and the bearing pins (4 and 5). The two crank webs (2 and 3) are connected to each other by a crank pin 6. The axis 7 of the crank pin 6 lies at a distance (k) to the bearing axis 8 of the bearing pins (4 and 5). In the assembled condition of a two-stroke engine, the bearing collar of a connecting rod carrying the piston is seated on the crank pin 6.

The crank pin 6 has a joining section 9 at both axial ends thereof. The joining sections 9 are fitted into corresponding press-fit bores 11 of the crank webs (2 and 3) by means of a press fit also known as an interference fit. The joining section 9 has an interference amount or oversize (ü) to the inner diameter (d) of the press-fit bore 11 with the oversize (ü) being exaggerated in FIG. 1 for clarity.

In the left-hand side of FIG. 1, the press fit 10 is shown before it is joined while on the right-hand side of FIG. 1, the press fit 10 is shown in the joined condition.

The press-fit bore 11 is configured so as to be expanded in its diameter especially at its end 11b facing toward the crank pin 6 in order to obtain a uniform stress load in the area of the press fit and to prevent stress peaks even in the case of loading. The press-fit bore 11 can be widened at both axial ends (11a and 11b).

In lieu of the press-fit bore 11, it can also be advantageous to configure the outer diameter of the joining section 9 of the crank pin 6 to have a diameter which becomes less toward its axial end 9a.

Figure 3:
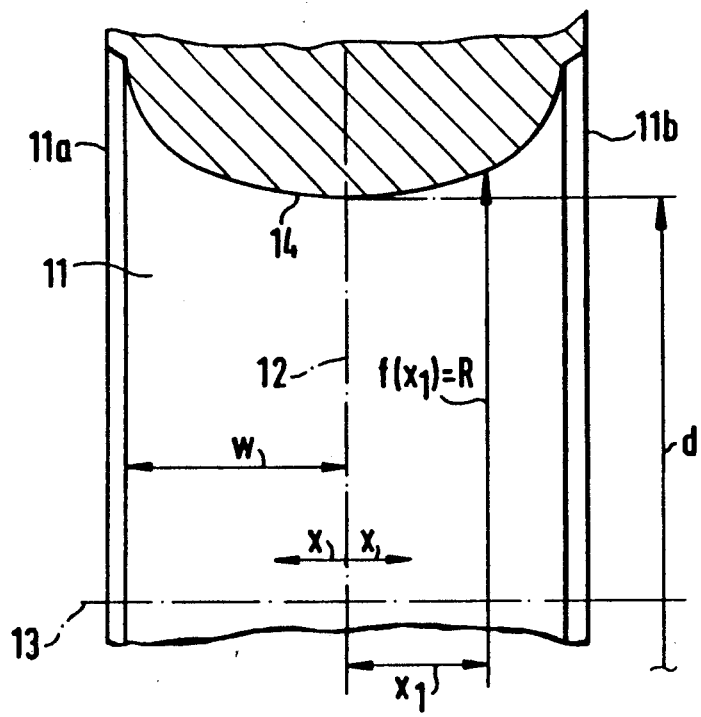
FIG. 3 is an enlarged diagram of an axial section through the press-fit bore.
Figure 2:
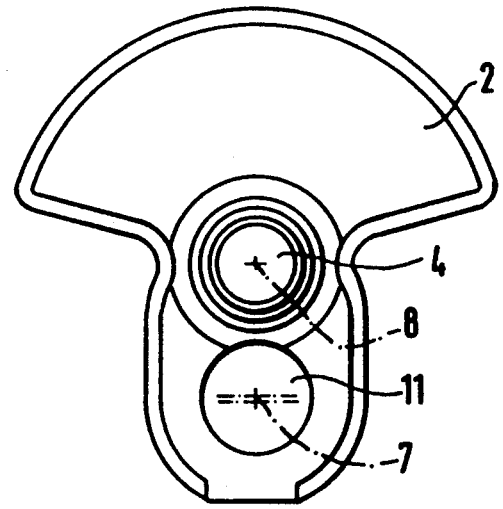
FIG. 2 is a plan view of the crank web showing the press-fit bore configured in accordance with an embodiment of the invention.

In FIG. 3, the inner diameter (d) of the press-fit bore is shown enlarged and widens toward the axial ends 11a and 11b. Starting from the axial center 12 of the press fit or of the press-fit bore 11, the radial distance (R) of the press-fit surface 14 to the center longitudinal axis 13 of the press fit 10 becomes greater with increasing distance (x) from the center axis 12 of the press-fit bore 11 toward the axial end 11a and toward the axial end 11b. In this way, the radial distance (R) changes according to a curve function f(x) wherein (x) is the axial distance to the axial center 12 of the press-fit bore 11. According to the invention, the curve function is an exponential function defined by the equation:

$$f(x) = a \cdot e^{b \cdot x}$$

wherein (a) and (b) are numerical constants which are selected in dependence upon the size of the bore diameter (d) and in dependence upon the overdimension (ü). For a composite crankshaft of a two-stroke engine, the constant (a) lies in the range of approximately 0.007 to approximately 0.05; whereas, the constant (b) lies in the range of approximately 5.0 to approximately 5.5. The selection of the constants in dependence upon the overdimension (ü) between the outer diameter of the joining section 9 of the crank pin 6 and the receiving diameter (d) of the press-fit bore 11 in the crank webs (2 or 3) is made such that for a small overdimension (ü), the constants (a) and (b) are small and for a large overdimension (ü), the constants (a) and (b) are large.

Figure 4:
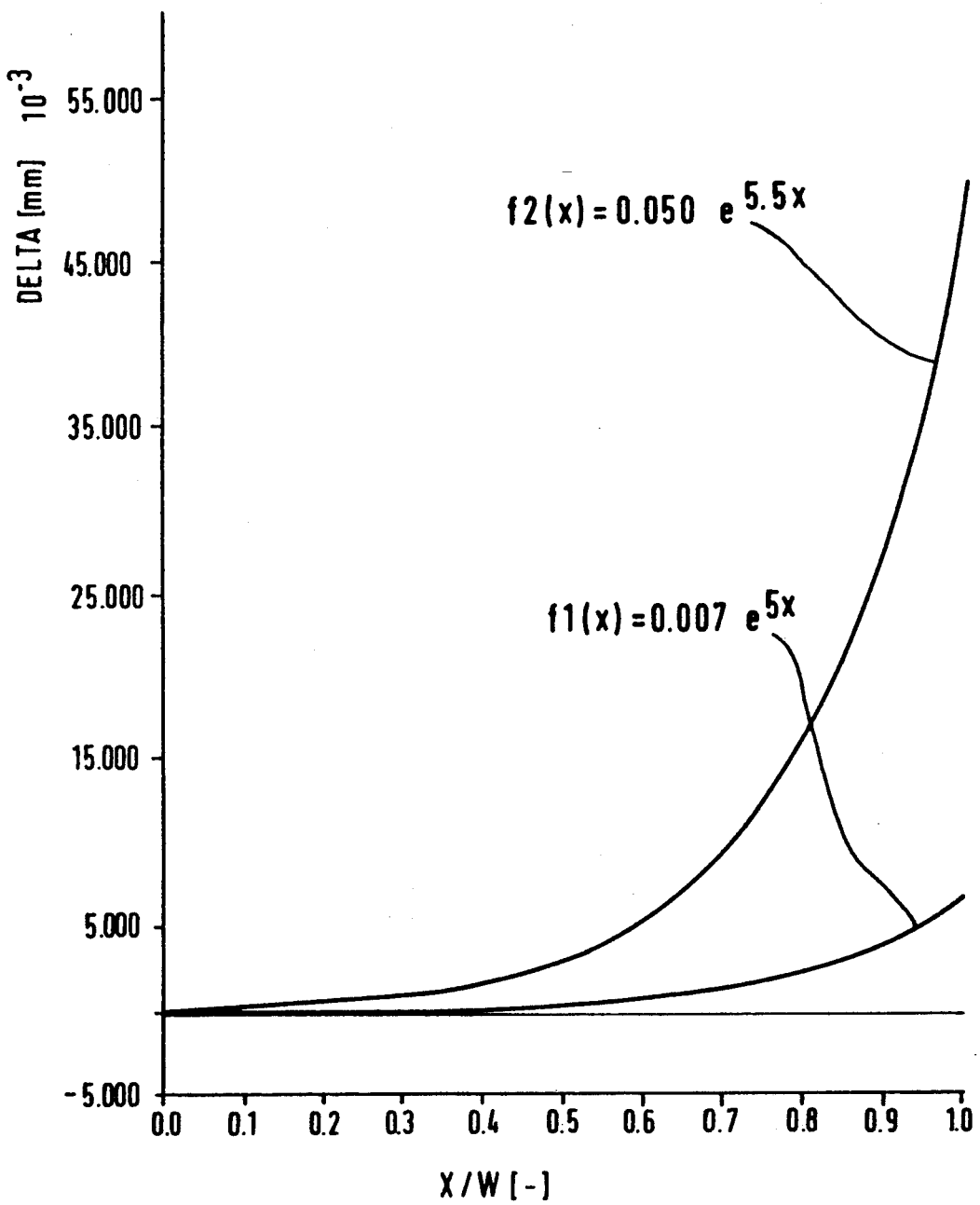
FIG. 4 is a curve showing the incremental (delta) diameter overlap of the press fit plotted against the axial distance to the center of the press fit with the axial distance being normalized over half of the web width; and, FIG. 5 is a diagram corresponding to that of FIG. 4 showing two curves plotted for specific overdimensions (delta).

Stated otherwise, the axial distance (R) to the center longitudinal axis 13 of the press-fit bore 11 changes in accordance with a curve which belongs to a family of curves. The family of curves is determined by the equation:

$$f1(x) = 0.0007\, e^{5x}$$

as the lower limit (FIG. 4) and by the equation:

$$f2(x) = 0.05\, e^{5.5x}$$

as the upper limit (FIG. 4). The function f1(x) is to be selected for the smallest bore diameter (d) and the minimal overdimension (ü) whereas, for the largest bore diameter (d) and the maximum overdimension (ü), the function f2(x) is appropriate.

The curves f1(x) and f2(x) in FIG. 4 are plotted as a function as the normalized half web width w (FIG. 3) in dependence upon the amount of the diameter overlap.

Figure 5:
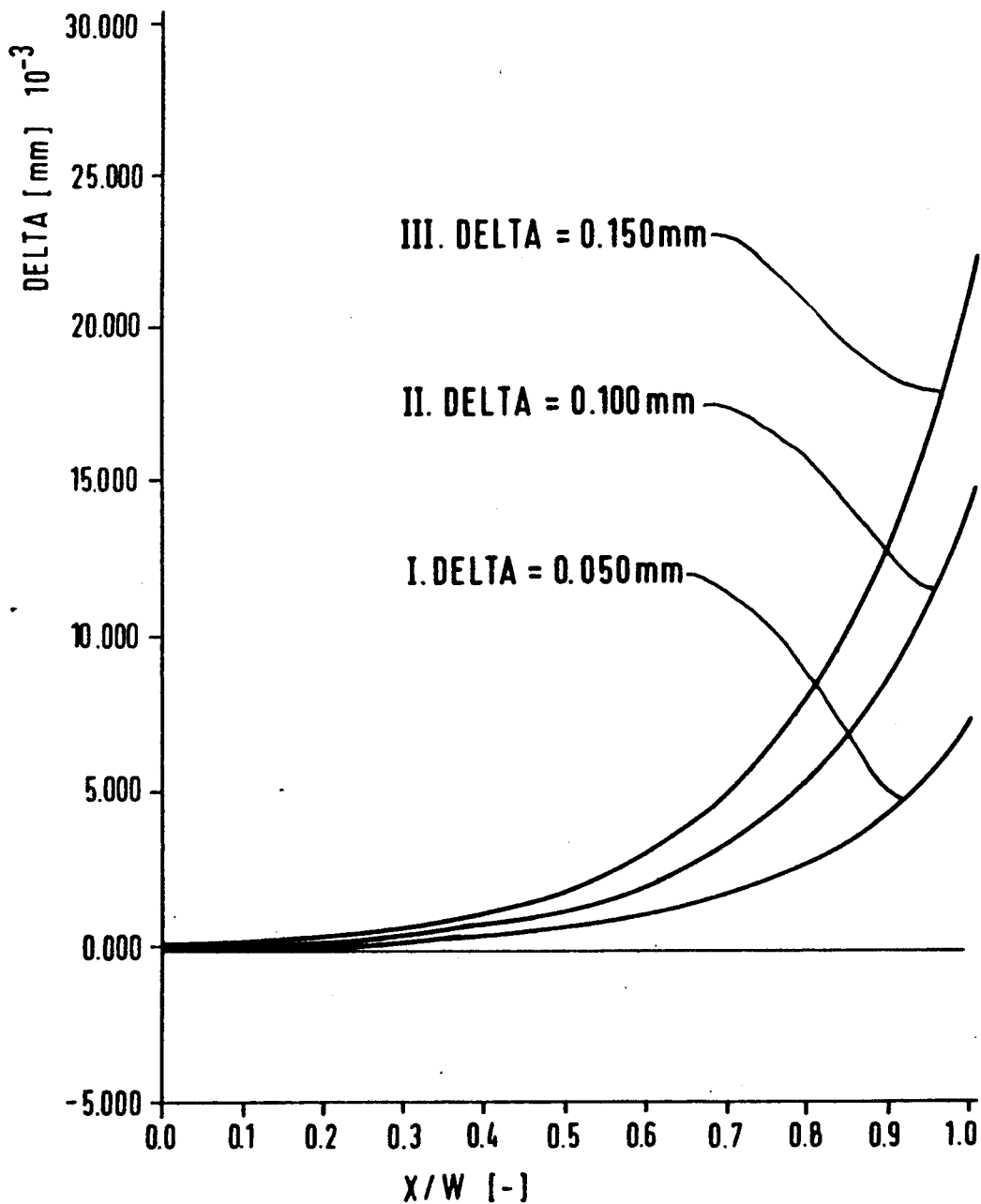

In a special embodiment of the invention, the curve for the section view shown in FIG. 3 runs in accordance with curve I in FIG. 5 for an overdimension (ü) of 0.05 mm. If the overdimension (ü) is equal to 0.1 mm, then the curve trace is in accordance with curve II in FIG. 5. For an overdimension (ü) of 0.15 mm, the curve trace is even steeper and is in accordance with curve III in FIG. 5.

It is understood that the foregoing description is that of the preferred embodiments of the invention and that various changes and modifications may be made thereto without departing from the spirit and scope of the invention as defined in the appended claims.

What is claimed is:

1. A composite crankshaft for a two-stroke engine such as for a two-stroke engine in portable handheld work apparatus including chain saws, cutoff machines and the like, the composite crankshaft comprising:
   a crank web;
   a crank pin;
   a press-fit for connecting said crank web and said crank pin to each other;
   said crank web having a first surface formed therein and said crank pin having a second surface formed thereon for engaging said first surface to define said press fit;
   said press fit defining a center longitudinal axis and having respective axial ends;
   said press fit further defining an axial center disposed between said axial ends;
   at least one of said surfaces being configured to have a radial spacing (R) from said axis which changes as a function of the axial distance (x) to said axial center of said press fit pursuant to an exponential function defined by the equation $$f(x) = a \cdot e^{b \cdot x}$$

wherein (a) and (b) are pregiven constants and f(x) is the radial distance (R).

2. The composite crankshaft of claim 1, said first surface defining a bore in said crank web and said second surface defining a portion of said crank pin inserted into said bore to define said press fit; and, said constants (a) and (b) being selected in dependence upon an interference amount (ü) between the diameter of said bore (d) and the diameter of said crank pin measured at said second surface so that for a small interference amount (ü), said constants (a) and (b) are small and for a large interference amount (ü), said constants (a) and (b) are large.

3. The composite crankshaft of claim 1, wherein said constant (a) lies in the range of approximately 0.007 to approximately 0.050.

4. The composite crankshaft of claim 3, wherein said constant (b) lies in a range of approximately 5.0 to approximately 5.5.

5. The composite crankshaft of claim 1, said first surface defining a bore in said crank web and said second surface defining a portion of said crank pin inserted into said bore to define said press fit; and, said first surface defining said bore being configured to have said radial spacing (R).

6. The composite crankshaft of claim 5, one of said axial ends of said press fit facing toward said crank pin; and, said first surface being configured to have said radial spacing (R) at said one axial end.

7. The composite crankshaft of claim 5, said first surface being configured to have said radial spacing (R) at both of said axial ends.

8. The composite crankshaft of claim 1, wherein said crankshaft is made of a light metal.

9. The composite crankshaft of claim 8, wherein said light metal is a magnesium alloy.

* * * * *

UNITED STATES PATENT AND TRADEMARK OFFICE
CERTIFICATE OF CORRECTION

PATENT NO. : 5,088,345

DATED : February 18, 1992

INVENTOR(S) : Ralf-Rainer Kemmler, Hans P. Stehle and Andreas Decool

It is certified that error appears in the above-identified patent and that said Letters Patent is hereby corrected as shown below:

In the title page, under "Assignee", reference numeral [73]: delete "Stihl Andreas" and substitute -- Andreas Stihl, Waiblingen, Fed. Rep. of Germany --.

Signed and Sealed this

Fourth Day of May, 1993

Attest:

MICHAEL K. KIRK

Attesting Officer

Acting Commissioner of Patents and Trademarks